United States Patent [19]

Kanayama

[11] Patent Number: 5,896,510

[45] Date of Patent: Apr. 20, 1999

[54] NETWORK COMMUNICATION SYSTEM WHERE EACH SYSTEM SHARES DEFINITION INFORMATION WITH EACH OTHER

[75] Inventor: Hidehiko Kanayama, Kawasaki, Japan

[73] Assignee: Fujitsu Limited, Kanagawa, Japan

[21] Appl. No.: 08/789,687

[22] Filed: Jan. 27, 1997

Related U.S. Application Data

[63] Continuation of application No. 08/638,870, Apr. 29, 1996, abandoned, which is a continuation of application No. 08/260,917, Jun. 15, 1994, abandoned.

[30] Foreign Application Priority Data

Sep. 20, 1993 [JP] Japan .................. 5-233410

[51] Int. Cl.$^6$ ............................................. G06F 15/16
[52] U.S. Cl. ...................... 395/200.58; 395/200.59; 395/200.56
[58] Field of Search .................. 395/200.1, 200.11, 395/284, 200.02, 200.03, 200.58, 200.3, 200.59, 200.56, 200.55, 200.61, 200.68, 200.78

[56] References Cited

U.S. PATENT DOCUMENTS

| | | | |
|---|---|---|---|
| 4,644,532 | 2/1987 | George et al. | 370/255 |
| 4,835,673 | 5/1989 | Rushby et al. | 395/200.55 |
| 4,926,468 | 5/1990 | Smith et al. | 379/147 |
| 5,018,059 | 5/1991 | Kerschner et al. | 379/246 |
| 5,167,035 | 11/1992 | Mann et al. | 395/182.02 |
| 5,208,811 | 5/1993 | Kashio et al. | 370/401 |
| 5,220,562 | 6/1993 | Takada et al. | 370/404 |
| 5,315,705 | 5/1994 | Iwami et al. | 395/200.75 |
| 5,327,560 | 7/1994 | Hirata et al. | 395/200.51 |
| 5,341,478 | 8/1994 | Travis, Jr. et al. | 395/200.33 |
| 5,373,504 | 12/1994 | Tanaka et al. | 370/253 |
| 5,377,327 | 12/1994 | Jain et al. | 395/200.65 |
| 5,426,637 | 6/1995 | Derby et al. | 370/401 |
| 5,442,791 | 8/1995 | Wrabetz et al. | 395/674 |
| 5,557,798 | 9/1996 | Skeen et al. | 705/35 |
| 5,634,011 | 5/1997 | Auerbach et al. | 395/200.72 |

*Primary Examiner*—Zarni Maung
*Attorney, Agent, or Firm*—Staas & Halsey

[57] ABSTRACT

In a network communication system enabling copying and mutual reflection of definition information among a plurality of systems interconnected over a backbone network, each of the plurality of systems has a host control unit for transferring definition information for communication with other system and manipulating received definition information, and a database for storing manipulated definition information. The host control unit includes an element for acquiring predefined network definition information for use in communication intended for copying, an element for copying definition information from a distributor-side system for distributing definition information, an element for referencing the copied definition information so as to specify a connection form of a communication resource governed by said distributor-side system, and an element for using the acquired network definition information to set communication path information concerning the distributor-side system in the copied definition information according to the specified connection form of a communication resource. Definition information manipulated by these elements is stored in the distributor-side system. Communication with the distributor-side system is effected based on the definition information. This configuration enables one system to share network definition information with other systems and permits reduction of a load of system management resulting from modification of definition information. The above network operation mode can apply to any network constructed to have a network topology of a LAN, WAN, or the like.

5 Claims, 5 Drawing Sheets

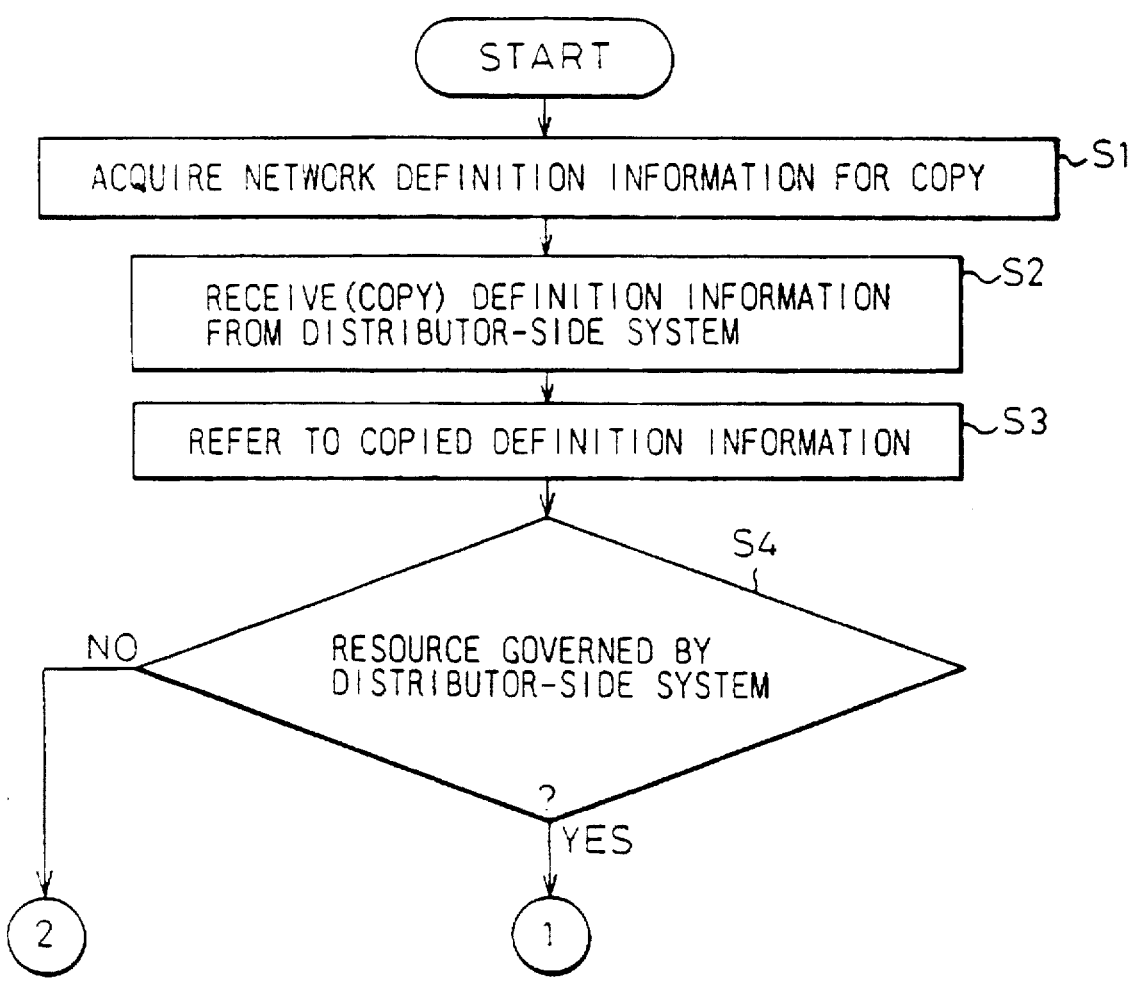

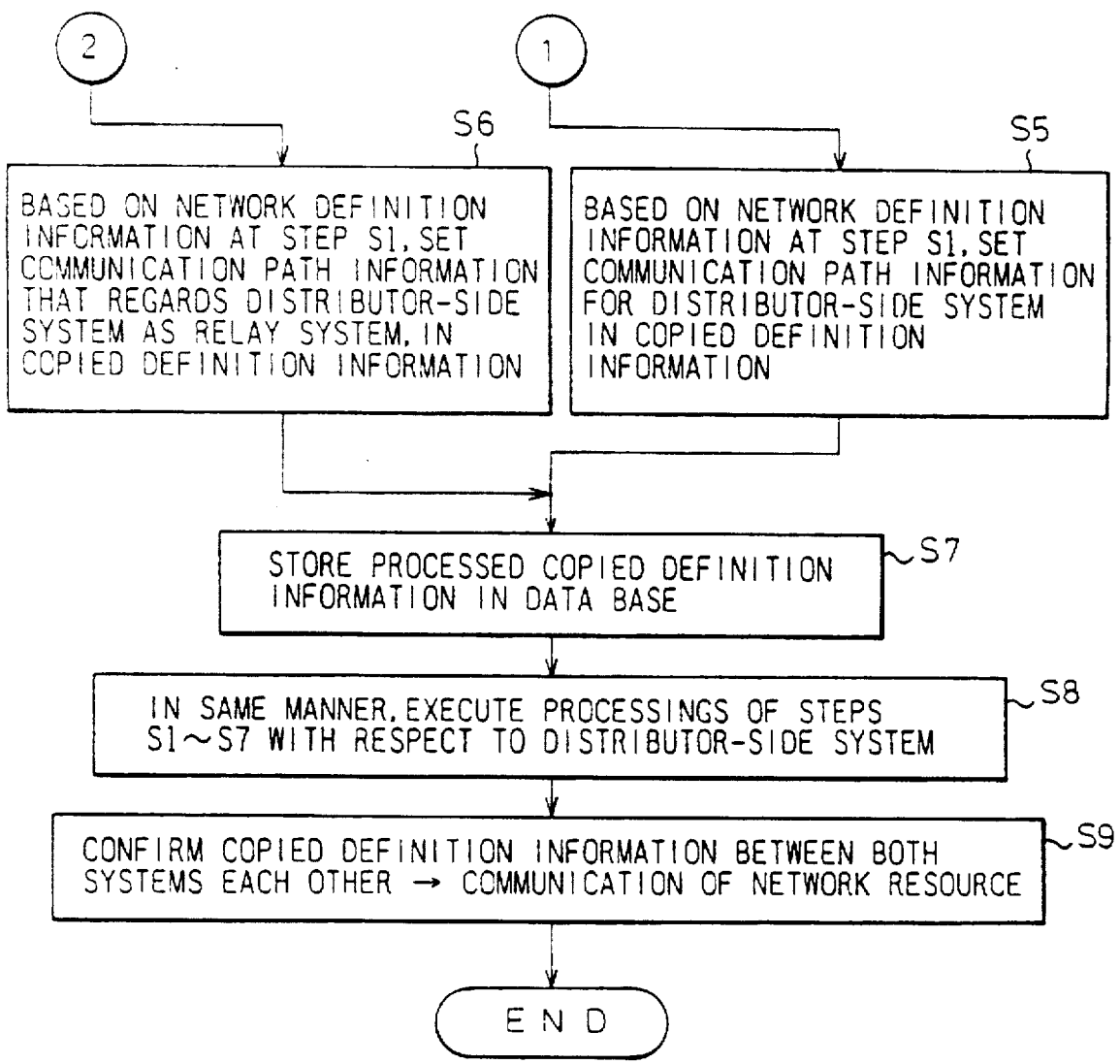

1

NETWORK COMMUNICATION SYSTEM WHERE EACH SYSTEM SHARES DEFINITION INFORMATION WITH EACH OTHER

This application is a continuation of application Ser. No. 08/638,870, filed on Apr. 29, 1996, now abandoned, which is a continuation of application Ser. No. 08/260,917, filed on Jun. 15, 1994, now abandoned.

BACKGROUND OF THE INVENTION

1. Field of the Invention

The present invention relates to a network communication system enabling sharing of definition information with other systems. More particularly, this invention is concerned with an art for enabling one of a plurality of systems interconnected over any network, such as a local area network (LAN) or wide area network (WAN), to share network definition information with other systems and for permitting a reduction in system management load resulting from modification of definition information.

2. Description of the Related Art

Generally, in a network (for example, LAN) system, a plurality of host systems or equivalent systems (which will be referred to merely as systems) are interconnected. Herein, inter-system communication requires network definition information concerning a communication resource governed by each individual system (terminal or application program managed directly by each system, which will be referred to as self-system definition information) as well as network definition information concerning a communication resource governed by a partner system (terminal or application program managed directly by a partner system, which will be referred to as other-system definition information). In short, during communication, both systems have self-system definition information and other-system definition information concerning a partner system.

The other-system definition information is definition information resulting from a sort of mapping. Specifically, self-system definition information retained by a partner system is copied so that other-system definition information need not be created.

In a conventional known network communication system based on copied information, network definition information is usually created by defining a communication resource governed by a partner system with a network viewed by another system.

In the foregoing conventional network communication system, network definition information is defined with a network viewed by a particular system. Definition information concerning a communication resource governed by a partner system is therefore seen varying, depending on the location of the communication resource governed by the partner system, by that particular system.

An example of varying information is communication path information. Communication path information included in definition information copied from a partner system is defined with a network viewed by a distributor-side system (partner system) of the copied information but not defined with the network viewed by a copier-side system. The communication path information can therefore not be used as it is.

According to the conventional network communication system in which definition information is merely copied from a distributor-side system, the operation mode based on the communication system can apply only to a simple LAN system.

SUMMARY OF THE INVENTION

An object of the present invention is to enable one system to share network definition information with another system and permit reduction of a load of system management resulting from modification of definition information. Another object of the present invention is to provide a network communication system offering the above network operation mode that can apply to any network constructed to have a network topology of a LAN, WAN, or the like.

For copying definition information, predefined network definition information for communication intended for copying is a must. The network definition information includes communication path definition information concerning systems (or communication path definition information concerning a backbone network constructed with host systems or equivalent systems).

Communication resources governed by a system on the side of distributing definition information are broadly classified into two types. One of the types includes communication resources regarded as part of a distributor-side system (terminals connected directly to channels of a distributor-side system or application programs running within a distributor-side system), while the other type includes communication resources such as terminals connected to a distributor-side system over a LAN, WAN, or other network.

In the present invention, predefined communication path definition information concerning a backbone network is used to set communication path information in definition information copied from another system, whereby the aforesaid problems in the prior art are solved.

According to the present invention, in a network communication system enabling copying and mutual reflection of definition information among a plurality of systems interconnected over a backbone network, each of the plurality of systems has a host control unit for transferring definition information for communication with other systems and controlling manipulation of received definition information, and a data base for storing manipulated definition information. The host control unit includes a means for acquiring predefined network definition information for use in communication intended for copying, a means for copying definition information from a distributor-side system for distributing definition information, a means for referencing the copied definition information so as to specify a connection form of a communication resource governed by the distributor-side system, and a means for using the acquired network definition information to set communication path information concerning the distributor-side system in the copied definition information according to the specified connection form of a communication resource. Thus, the present invention provides a network communication system in which definition information manipulated by the above means is stored in the data base, and communication with the distributor-side system is effected based on the definition information.

BRIEF DESCRIPTION OF THE DRAWINGS

Other objects and features of the present invention will be described in detail in conjunction with preferred embodiments with reference to the appended drawings. Among the appended drawings:

FIGS. 3a and 3b are flowcharts presenting copying and manipulation of definition information executed by a host control unit shown in FIG. 2 and a sequence for communication based on the definition information.

DETAILED DESCRIPTION OF PREFERRED EMBODIMENTS

Figure 1A:
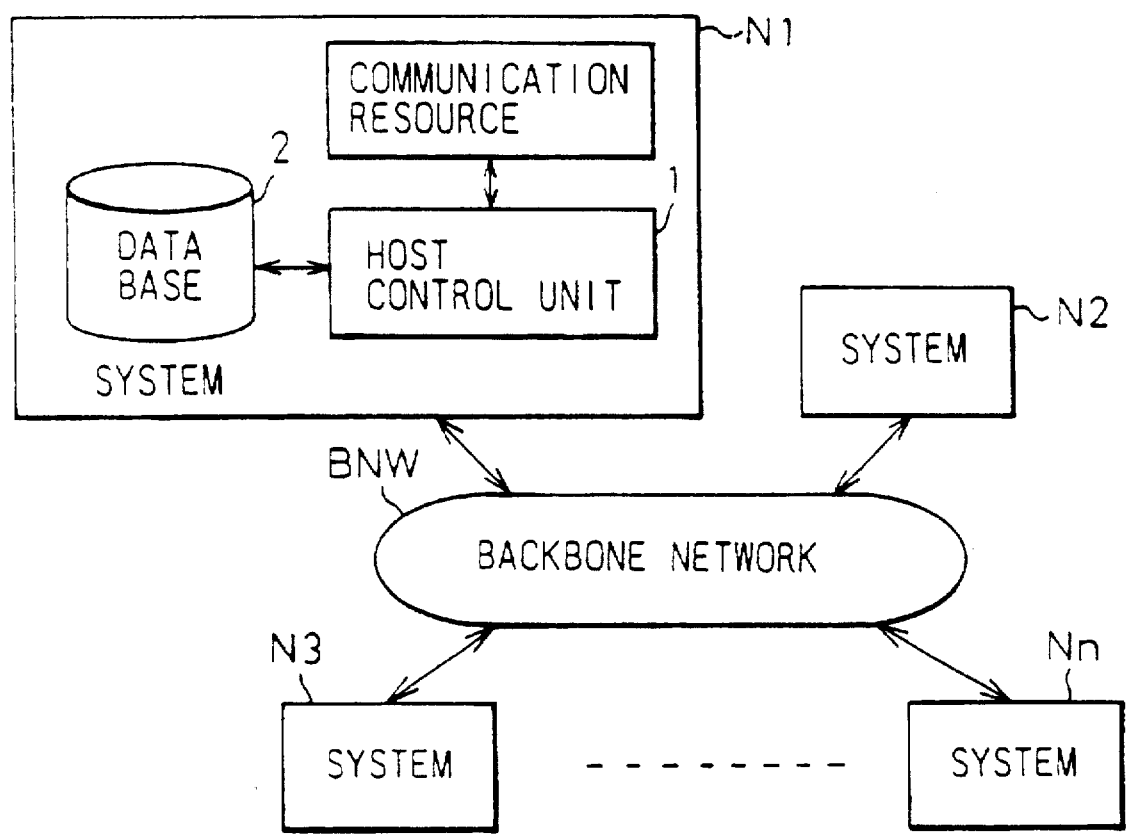
FIGS. 1a and 1b show a basic configuration for a network communication system enabling sharing of definition information with other systems which relates to the present invention.
Figure 1B:
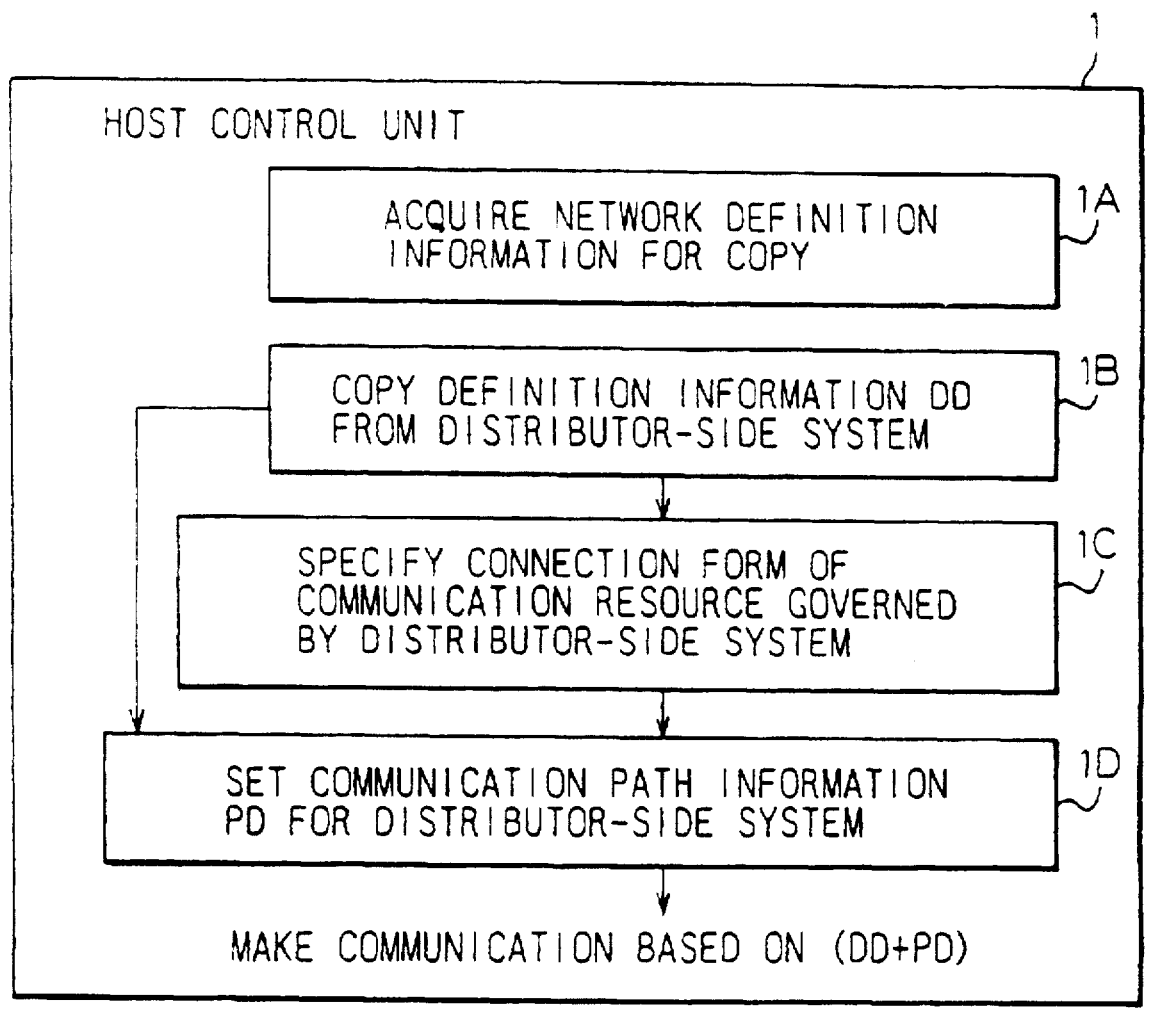

FIGS. 1a and 1b show a basic configuration for a network communication system enabling sharing of definition information with other systems which relates to the present invention.

As illustrated, a network communication system enables copying and mutual reflection of definition information among a plurality of systems N1 to Nn interconnected over a backbone network BNW. Each of the plurality of systems N1 to Nn has a host control unit 1 for transferring definition information for communication with other systems and controlling manipulation of received definition information, and a database 2 for storing manipulated definition information.

The host control unit 1 includes a means 1A for acquiring predefined network definition information for use in communication intended for copying, a means 1B for copying definition information DD from a distributor-side system for distributing the definition information DD, a means 1C for referencing the copied definition information so as to specify a connection form of a communication resource governed by the distributor-side system, and a means 1D for using the acquired network definition information to set communication path information PD concerning the distributor-side system in the copied definition information according to the specified connection form of a communication resource. Definition information manipulated by the above means is stored in the data base 2. Based on the definition information, the system communicates with the distributor-side system.

In a preferred embodiment of the present invention which will be described later, definition information DD copied from the distributor-side system includes information instructing a connection form of a communication resource governed by the distributor-side system. The means 1C for specifying a connection form of a communication resource includes a means for determining of what type a communication resource governed by the distributor-side system is (that is, whether the communication resource is regarded as part of the distributor-side system or connected to the distributor-side system over a LAN, WAN, or the like). Communication path information concerning the distributor-side system is set based on the result of determination and acquired network definition information.

According to the configuration shown in FIGS. 1a and 1b, definition information concerning a communication resource governed by a distributor-side system (other-system definition information) is made available by manipulating definition information copied from the distributor-side system optimally for that system. Communication with the distributor-side system is effected based on the manipulated definition information.

The configuration therefore enables one system to share network definition information with other systems and permits reduction of a load of system management resulting from modification of definition information. The aforesaid network operation mode can apply to any network constructed to have a network topology of a LAN, WAN, or the like. This will contribute greatly to exertion of a marked industrial effect.

Once definition information DD copied from a distributor-side system is provided with information instructing a connection form of a communication resource governed by the distributor-side system, a copier-side system can determine what type the communication resource governed by the distributor-side system is.

In this case, definition of the communication resource regarded as part of the distributor system is such that since the distributor-side system itself is a communication destination, communication path information included in network definition information used for copying is set as communication path information PD concerning the distributor-side system (partner system) in the copied definition information as it is.

For definition of a resource connected to the distributor-side system over a LAN, WAN, or the like, communication path information PD allowing the distributor-side system to act as a relay system is set in the copied definition information. In other words, the distributor-side system (which is not a final destination of communication) has self-system definition information from which copied definition information is derived. The self-system definition information includes communication path information concerning the distributor-side system. Therefore, once communication with the distributor-side system is achieved, communication with an intended communication resource can be performed using the distributor-side system as a relay system.

Next, a preferred embodiment of the present invention will be described with reference to FIGS. 2, 3a, and 3b.

Figure 2:
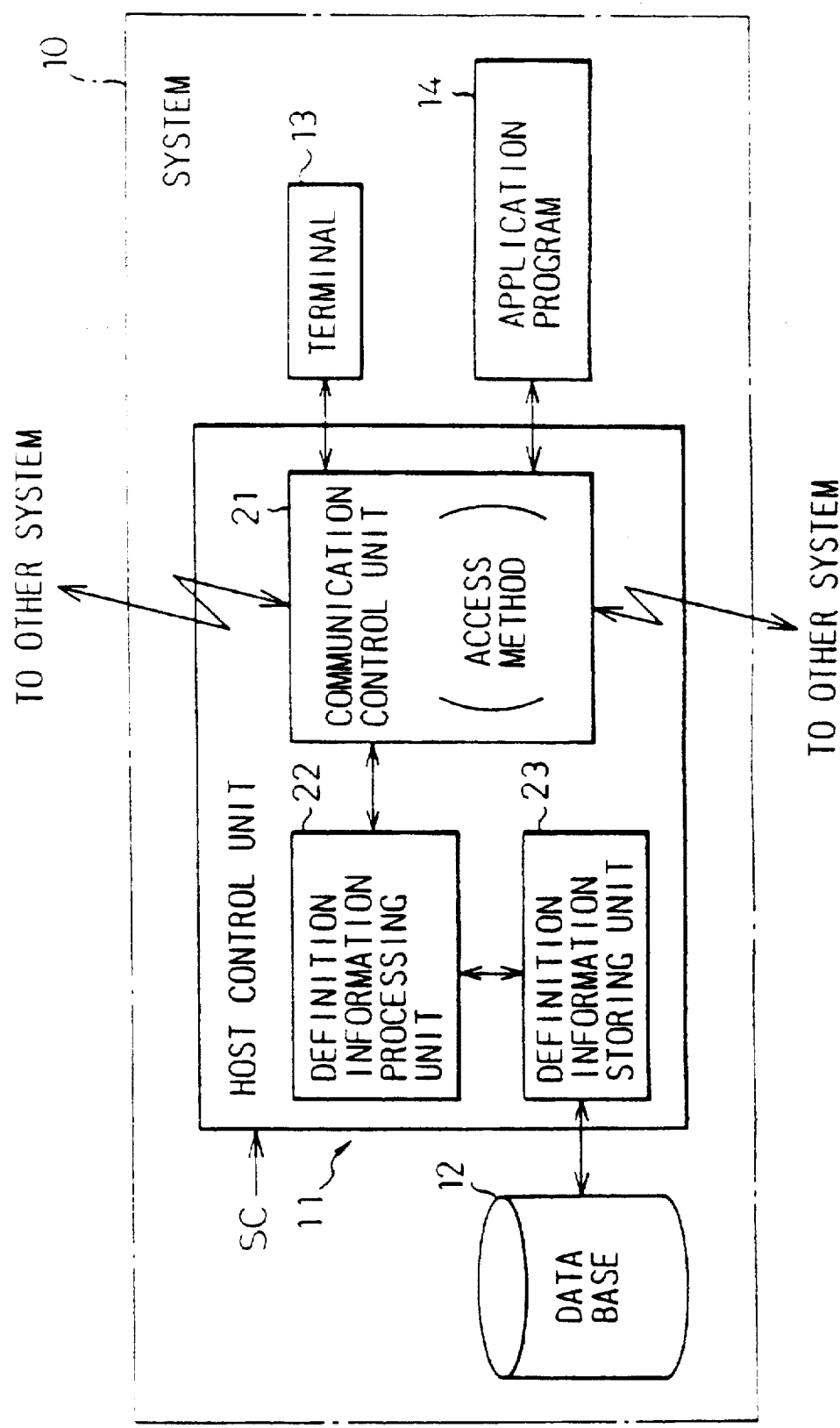
FIG. 2 is a block diagram showing a system configuration as an embodiment for realizing a network communication system relating to the present invention.

FIG. 2 shows a system configuration as an embodiment for realizing a network communication system relating to the present invention.

In FIG. 2, 10 denotes one of a plurality of network systems constructing a network such as a LAN, WAN, or the like. The system 10 is connected to other systems over a backbone network. The system 10 has a host control unit 11 for transferring definition information for communication with other system and controlling manipulation of received definition information, a database 12 for storing manipulated definition information and predefined network definition information for use in communication intended for copying, a terminal (communication resource) 13 connected directly to a channel of the system, and an application program 14 (communication resource) running within the system.

The host control unit 11 includes a communication control unit 21 (access method) for controlling communication including transfer of definition information to or from other system, a definition information processing unit 22 for manipulating received definition information, and a definition information storing unit 23 for storing network definition information for use in copying if necessary and temporarily storing definition information copied from a distributor-side system. SC denotes a Start command for initializing the system. As described later, when the Start command SC is fed to the host control unit 11, the network definition information for use in copying is retrieved from the data base 12 and fetched into the definition information storing unit 23.

Next, a sequence for copying and manipulating definition information and then effecting communication based on the definition information, which is executed by the host control unit 11 in each of systems concerned with network communication, will be described with reference to the flowcharts of FIGS. 3a and 3b.

At step S1, predefined network definition information for use in copying is acquired. The network definition information is retrieved from the database 12 in response to a Start command SC indicating initialization of a copier-side system or acquired from a distributor-side system via the communication control units (access methods) in both the distributor-side and copier-side systems when making a reply to a Communication Start request sent from the distributor-side system. The thus-acquired network definition information for copying is temporarily stored in the definition information storing unit 23.

At succeeding step S2, self-system definition information sent from the distributor-side system (other-system definition information when viewed by the copier-side system) is received (that is, definition information is copied). At this time, before the distributor-side system transmits definition information to the copier-side system, information instructing a connection form of communication resources is included in the definition information. The definition information thus copied from the distributor-side system is stored in the definition information storing unit 23 via the communication control unit 21 and definition information processing unit 22.

At succeeding step S3, the definition information processing unit 22 references copied definition information existent in the definition information storing unit 23. At succeeding step S4, the information instructing a connection form of a communication resource included in the definition information is checked to determine whether or not the communication resource is regarded as part of the distributor-side system (a terminal connected to a channel of the distributor-side system or an application program running within the distributor-side system). In other words, it is determined whether the communication resource is connected to the distributor-side system over a LAN, WAN, or the like. If the result of determination is in the affirmative, control is passed to step S5. If the result of determination is in the negative, control is passed to step S6.

At step S5, the definition information processing unit 22 sets communication path information concerning the distributor-side system in the copied definition information using the network definition information having been acquired at step S1 and stored in the definition information storing unit 23 (that is, the copied definition information is manipulated optimally for that system). Similarly, at step S6, the definition information processing unit 22 sets communication path information, which allows the distributor-side system to act as a relay system, in the copied definition information using the network definition information having been acquired at step S1 and stored in the definition information storing unit 23 (that is, the copied definition information is manipulated optimally for that system). At succeeding step S7, the copied definition information that has been manipulated is stored in the data base 12 via the definition information storing unit 23.

Through the aforesaid sequence from step S1 to S7, the definition information copied from the distributor-side system has been manipulated with the network viewed by the copier-side system.

At succeeding step S8, the aforesaid sequence to be executed in the copier-side system applies to the distributor-side system. The same sequence as that from step S1 to S7 is repeated.

At succeeding step S9, both the copier-side and distributor-side systems identify copied definition information (that is, self-system definition information and other-system definition information registered in the data base 12 through the sequence from step S1 to S8). This enables communication of a network resource between systems interchanging definition information. Thereafter, the copier-side system receives a Communication End request from the distributor-side system. When the copier-side system makes a reply to the Communication End request, the network communication terminates.

As described so far, in a definition information sharing system of this embodiment, definition information concerning a communication resource governed by a distributor-side system (other-system definition information) is made available by manipulating definition information copied from the distributor-side system optimally for a copier-side system. Communication with the distributor-side system is effected based on the thus-manipulated definition information.

In addition to an advantage that one system can share network definition information with other system and a load of system management resulting from modification of definition information can be reduced, there arises an advantage that the network operation mode can apply to any network constructed to have a network topology of a LAN, WAN, or the like (for example, a banking system or any other large-scale and complex network).

In inter-system communication for copying and mutual reflection of definition information, predefined communication path definition information concerning a backbone network is used to set communication path information in copied definition information. This exerts an adverse effect of leaving the backbone network unaffected. Consequently, the communication capability of the backbone network can be utilized as it is.

The present invention has been disclosed and described in conjunction with one embodiment. It will be apparent for any person with ordinary skill in the art that other embodiments and variants of the present invention can be formed without departing from the requisite features of the invention.

What is claimed is:

1. A method for interconnecting a plurality of systems over a backbone network sharing network definition information with other systems, comprising:

storing process definition information in a database;

acquiring network definition information for copying from either the database or one of the other systems;

copying system definition information from and defined for a distributor system, as copied definition information to be defined for a copier system;

specifying a connection form of a communication resource governed by the distributor system and having a reference in the copied definition information, by judging a classification of the communication resource governed by the distributor system;

setting communication path information for the distributor system into the copied definition information to obtain revised definition information stored in the database, according to the connection form of the communication resource modified for the copier system based on a result of said judging and the network definition information; and communicating between the copier system and the distributor system based on the revised definition information.

2. The method for interconnecting a plurality of systems over a backbone network according to claim 1, wherein when the result of said judging indicates that the communication resource governed by the distributor system is regarded as part of the distributor system, said setting of the communication path information includes setting the communication path information included in the network definition information as the communication path information for the copier system.

3. The method for interconnecting a plurality of systems over a backbone network according to claim 1, wherein when the result of said judging indicates that the communication resource governed by the distributor system is connected to the distributor system over a local or wide area network, said setting of the communication path information includes setting relay communication path information, indicating that the distributor system is a relay system, into the copied definition information.

4. The method of interconnecting a plurality of systems over a backbone network according to claim 1, further comprising storing the network definition information and the copied definition information.

5. A method for interconnecting a plurality of systems over a backbone network sharing network definition information with other systems, comprising:

storing process definition information in a database;

acquiring network definition information for copying from either the database or one of the other systems;

copying system definition information from and defined for a distributor system, as copied definition information to be defined for a copier system;

specifying a connection form of a communication resource governed by the distributor system and having a reference in the copied definition information;

setting communication path information for the distributor system into the copied definition information to obtain revised definition information stored in the database, according to the connection form of the communication resource modified for the copier system based on the network definition information; and controlling communication including transmission and reception of the network definition information, and said acquiring of the network definition information for copying from the distributor system by way of a communication control unit upon receipt of a request for a start of a communication from the distributor system.

* * * * *

UNITED STATES PATENT AND TRADEMARK OFFICE
CERTIFICATE OF CORRECTION

PATENT NO.: 5,896,510
DATED : April 20, 1999
INVENTOR(S): Hidehiko KANAYAMA

It is certified that error appears in the above-identified patent and that said Letters Patent is hereby corrected as shown below:

On the title page, [73] Assignee, change "Kanagawa" to --Kawasaki--.

Signed and Sealed this

Thirtieth Day of November, 1999

Attest:

Q. TODD DICKINSON

Attesting Officer

Acting Commissioner of Patents and Trademarks